United States Patent
Yamaguchi

(10) Patent No.: US 7,167,271 B1
(45) Date of Patent: Jan. 23, 2007

(54) IMAGE RECORDING APPARATUS

(75) Inventor: Akira Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/572,460

(22) Filed: May 17, 2000

(30) Foreign Application Priority Data

May 17, 1999 (JP) ............................... 11-135202

(51) Int. Cl.
- H04N 1/393 (2006.01)
- H04N 1/409 (2006.01)
- G06T 3/40 (2006.01)
- G06T 5/00 (2006.01)

(52) U.S. Cl. .................. 358/1.2; 358/3.27; 358/451; 382/266; 382/299

(58) Field of Classification Search .............. 358/3.27, 358/451, 448, 1.9, 532, 1.1, 1.2; 382/276, 382/254, 263, 299, 266, 128, 298
See application file for complete search history.

(56) References Cited

U.S. PATENT DOCUMENTS

| | | | | |
|---|---|---|---|---|
| 4,748,511 A | * | 5/1988 | Nichols et al. | 382/232 |
| 4,860,112 A | * | 8/1989 | Nichols et al. | 358/1.9 |
| 4,910,609 A | * | 3/1990 | Nicholas et al. | 382/232 |
| 5,170,261 A | * | 12/1992 | Cargill et al. | 358/3.12 |
| 5,221,971 A | * | 6/1993 | Allen et al. | 358/3.01 |
| 5,355,303 A | * | 10/1994 | Ferla et al. | 347/238 |
| 5,369,497 A | * | 11/1994 | Allen et al. | 358/3.12 |
| 5,671,070 A | * | 9/1997 | Przybylowicz et al. | 358/487 |
| 5,956,470 A | * | 9/1999 | Eschbach | 358/1.9 |
| 5,987,345 A | * | 11/1999 | Engelmann et al. | 600/407 |
| 6,130,966 A | * | 10/2000 | Sekine et al. | 382/299 |
| 6,192,265 B1 | * | 2/2001 | Carlsen et al. | 600/425 |
| 6,351,276 B1 | * | 2/2002 | Yamaguchi | 347/188 |
| 6,424,730 B1 | * | 7/2002 | Wang et al. | 382/128 |
| 6,642,416 B2 | * | 11/2003 | Krishnan et al. | 382/299 |

(Continued)

FOREIGN PATENT DOCUMENTS

JP 09-050516 2/1997

(Continued)

OTHER PUBLICATIONS

Patent Abstract of Japan 10044484 Feb. 17, 1998.

(Continued)

Primary Examiner—Scott A. Rogers
(74) Attorney, Agent, or Firm—Sughrue Mion, PLLC

(57) ABSTRACT

The image recording apparatus has a sharpness correcting device which performs a sharpness correction process on image data supplied from a medical diagnostic image generating apparatus, an electronic scaling device which performs an electronic magnification process of integral multiple on the image data from the sharpness correcting device and an outputting device which performs image recording with recording pixel density which is an integral multiple of the reading pixel density in the medical diagnostic image generating apparatus using the image data processed in the electronic scaling device and then outputs a hardcopy by performing a dry process. The apparatus is capable of outputting the medical diagnostic image which has high sharpness and high quality as well as the size equal to that of the affected areas part by utilizing a dry printer that is easy to perform the processing such as the development and the maintenance.

8 Claims, 3 Drawing Sheets

U.S. PATENT DOCUMENTS

2002/0181029 A1* 12/2002 Fredlund et al. ............ 358/487

FOREIGN PATENT DOCUMENTS

| JP | 10-44484 | 2/1998 |
| JP | 10-226174 | 8/1998 |
| JP | 10-271291 | 10/1998 |
| JP | 10-278331 | 10/1998 |
| JP | 11-136499 | 5/1999 |

OTHER PUBLICATIONS

Patent Abstract of Japan 10226174 Aug. 25, 1998.

* cited by examiner

IMAGE RECORDING APPARATUS

BACKGROUND OF THE INVENTION

The present invention relates to the technical field of an image recording apparatus and, more particularly, to a so-called dry printer that outputs a hardcopy by performing dry process (or dry developing process) on a recording material on which a diagnostic image read by a medical diagnostic image generating apparatus has been reproduced.

Medical diagnostic images taken by various types of the medical diagnostic image generating apparatuses utilizing techniques such as ultrasonography, computed tomography (CT), magnetic resonance imaging (MRI), radiography and computed radiography (CR) such as Fuji computed radiography (FCR) have conventionally been recorded on silver-salt photographic light-sensitive materials to produce hard copies.

However, the silver-salt photographic light-sensitive materials have the advantage of yielding high-quality images, but the wet development process thereof is time-consuming and laborious because of the necessity of the wet development process including color development, bleach-fix and wash, and the maintenance of developing machines such as wet-type processors is also a time-consuming job. Therefore, it is desired that hard copies are outputted by an image recording method which eliminates the need for wet process, namely, a method utilizing a dry printer, while using recording materials.

As the dry printer, a thermal recording apparatus using a thermal head or a heat-mode laser has been known.

Thermal recording uses a thermal head having a glaze in which heat-generating elements are arranged in one direction (i.e., main scanning direction). The respective heat-generating elements are heated in accordance with an image to be recorded, while moving the glaze and a thermal recording material relative to each other in the direction perpendicular to the main scanning direction, with the former being pressed on the latter. The thermal recording material is thus heated imagewise. On the other hand, in thermal recording in which a heat-mode laser is used, a thermal recording material containing a light absorbing agent and a light beam modulated in accordance with the image to be recorded are used. The thermal recording material is heated by being exposed imagewise by two-dimensional scanning with the thus modulated light beam whereupon the image is recorded thereon.

As the dry printer, an apparatus which performs image recording by means of exposing and thermal color forming, utilizing a light-sensitive and thermally developed recording material or a light-sensitive and thermal recording material has also been known.

Such apparatus, which uses, for example, a recording material containing an organic silver salt which produces a color by exposure and heating or another recording material containing a photo-curing agent and a heat-responsive microcapsule, records a latent image thereon by exposure and then changes the thus recorded latent image into a visible image by forming the color in either an exposed portion or unexposed portion thereof by heating whereupon the hardcopy having the visible image formed thereon is outputted.

In recent years, the quality of the image obtained by such dry printer has been significantly improved, and an extension of its use from recording of the conventional ultrasonic diagnostic image to other applications such as CT, MRI and radiography (CR) that require largesize and high-quality images has been reviewed and put to practical use.

Medical diagnosis to be performed by means of the image ordinarily uses a monochromatic image and is executed by viewing a fine structure from differences of densities in the image. Therefore, the medical diagnostic image is required to have extremely high sharpness (a high degree of sharpness).

Moreover, it is required in many cases that, in order to execute more accurate diagnosis, for example, as the diagnostic image of a chest or that used in orthopedics which has been taken by FCR (Fuji computed radiography), an image having a size equal to that of a subject, namely, an affected areas part, is to be outputted.

In this case, when the image having the size equal to that of the affected areas part is outputted, if a pixel size at the time of image reading (reading pixel density) with the diagnostic image generating apparatus such as FCR or the like and a recording pixel size (recording pixel density) in an image recording apparatus which outputs the diagnostic image as the hardcopy are different from each other, there exists a need for a magnification or a minification of the image by means of electronic magnification processing or electronic scaling.

For example, in a case that reading pixel density in the diagnostic image generating apparatus is 254 dpi (dots per inch) and the recording pixel density in the image recording apparatus is 300 dpi, sizes of pixels in the former density and latter density are 100 μm and 84.7 μm per pixel, respectively. In order to output the image having the size equal to that of the reading image, interpolation magnifying process, that is, multiplication of ca. 1.18 times, must be performed.

If the interpolation magnifying process multiplied by such non-integer is performed by means of spline interpolation or the like, frequency characteristics of the image are commonly deteriorated and, as a result, sharpness of the image is decreased; hence, the thus processed image is not preferable as a diagnostic image.

Moreover, if the interpolation magnifying process multiplied by the non-integer is performed on a replication, distortion of the image is clearly recognized visually; hence, the thus processed image is not preferable as the diagnostic image, either.

Furthermore, in the image recording by such dry printer as described above, the sharpness of the image is lower than that of the image in a silver-salt photography which has been subjected to wet process.

For example, in the thermal recording, a mechanism which develops a color by heating the thermal material to form an image thereon can not prevent developing the color in an area in which the color should not be primarily developed or generating an area in which a color of a higher density than a density originally aimed at is developed; as a result, sharpness of the image is decreased.

Moreover, in the image recording utilizing light, there is a decrease of sharpness due to halation (scattering, reflection or propagation of light). In wet-type image recording using the silver-salt photographic light-sensitive material, it is possible to add a substantial amount of halation inhibitor to the recording material since it is capable of being removed (washed) at the time of the wet process. Whereas, in the image recording by the dry printer, it is impossible to remove the halation inhibitor throughout the image forming process so that a sufficient amount of the halation inhibitor can not be added; as a result, there occurs decrease of sharpness of the image due to the halation. In addition to the above, in a recording material using microcapsules, reflection or scattering of light is brought about by the microcapsules whereupon decrease of sharpness of the image occurs.

SUMMARY OF THE INVENTION

The present invention has been accomplished under these circumstances and has an object to solve above problems inherent in prior arts and provide an image recording apparatus capable of outputting an image having a size equal to that of a diagnostic image produced by a diagnostic image generating apparatus and recorded with a high degree of sharpness in a dry printer outputting a hardcopy without performing a wet processing operation.

In order to achieve the above object, the present invention provides an image recording apparatus for outputting a hardcopy using image data supplied from a medical diagnostic image generating apparatus, comprising a sharpness correcting device for performing a sharpness correction process on the image data supplied from the medical diagnostic image generating apparatus; a scaling device for performing an electronic magnification process of an integral multiple on the image data processed in the sharpness correcting device; and an outputting device for performing image recording with a recording pixel density which is an integral multiple of a reading pixel density in the medical diagnostic image generating apparatus using the image data processed in the scaling device and then outputting the hardcopy by performing a dry process.

Preferably, the recording pixel density in the outputting device is 508 dpi and, also preferably, the electronic magnification process in the scaling device is performed by means of replication.

DETAILED DESCRIPTION OF THE INVENTION

An image recording apparatus of the present invention will now be described in detail with reference to the preferred embodiments shown in the accompanying drawings.

Figure 1:
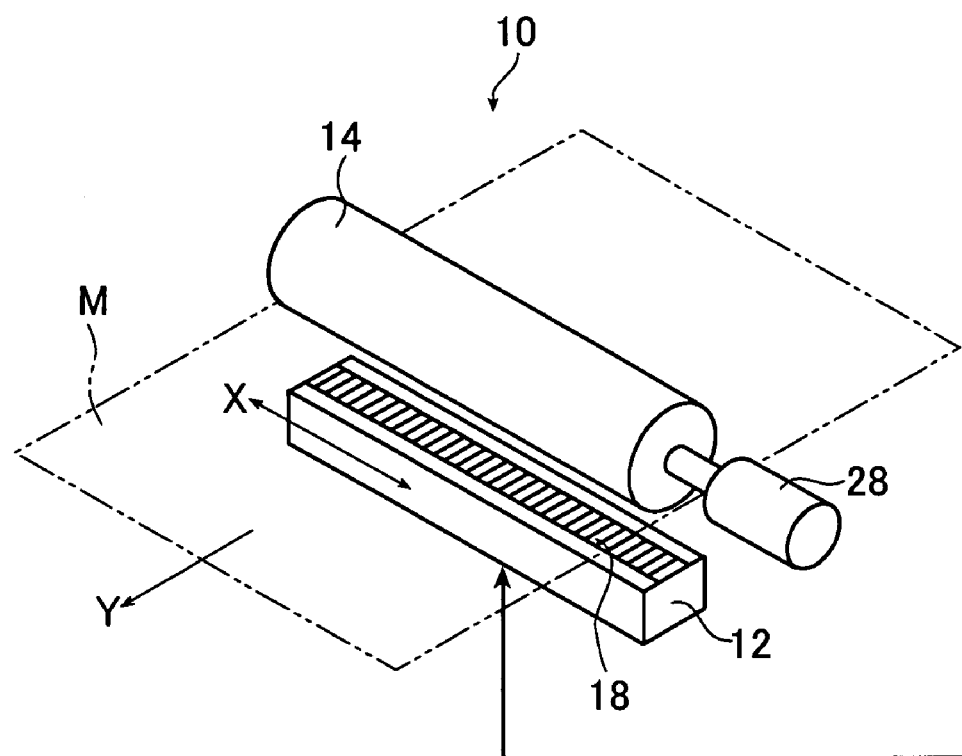
FIG. 1 is a schematic diagram showing an embodiment which applies an image recording apparatus of the present invention to a thermal recording apparatus using a thermal head.
Figure 1:
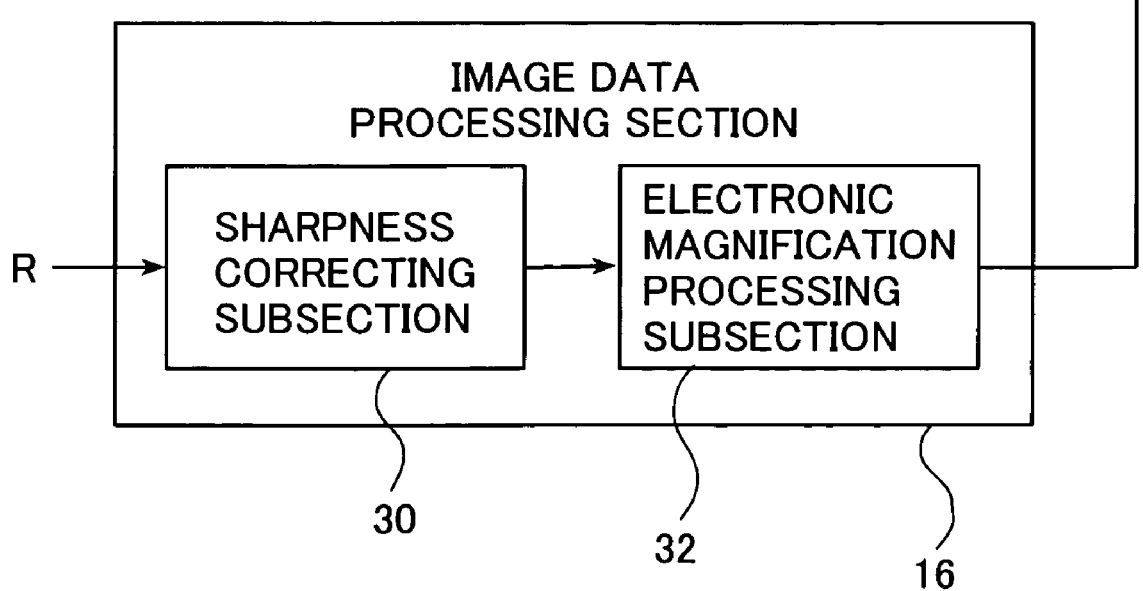

FIG. 1 shows a schematic diagram of an embodiment which applies an image recording apparatus of the present invention to a thermal recording apparatus using a thermal head.

The thermal recording apparatus 10 shown in FIG. 1 outputs as a visible image a hardcopy which reproduces image data (diagnostic image) supplied from various image data supply sources R, that is, various medical diagnostic image generating apparatuses (modalities) such as an apparatus for CR, e.g. FCR (Fuji computed radiography), ultrasonography, CT scanning, MRI, radiography or the like, and comprises a thermal head 12, a platen roller 14 and an image data processing section 16.

The image recording apparatus of the present invention is not limited to the thermal recording apparatus using the thermal head but is favorably applicable to various dry printers which each output the hardcopy without performing a wet process.

For example, except for the thermal recording apparatus using the thermal head, a thermal recording apparatus using the heat-mode laser is also permissible.

Moreover, image recording by means of exposing and thermal color forming using a light-sensitive and thermally developed recording material or light-sensitive and thermal recording material is also applicable.

For example, illustrated is image recording which uses a light-sensitive thermal recording material having an image forming layer that is composed of a binder 50% and more of which is composed of latex and that contains an organic silver salt and a reducer thereof on a surface of a substrate. When such recording material is exposed, it forms a latent image nucleus by a photocatalyst of a light-sensitive silver halide or the like therein; then, when the recording material carrying thus formed nucleus is heated, silver of an organic silver salt is ionized by an action of the reducer therein; then, the thus ionized silver moves to combine with a light-sensitive silver halide thereby forming a crystal silver; as a result, an image is formed.

The image recording apparatus utilizing such recording material, for example, forms the latent image by exposing the recording material imagewise with a laser beam modulated in accordance with the image to be recorded and then heats the thus exposed recording material to form a color in the exposed portion thereby changing the latent image into a visible image.

The image recording may be performed using a recording material having an image forming layer comprising an electron-donating achromatic dye encapsulated in a heat-responsive microcapsule, as well as a compound containing both an electron-receptive part and a polymerizable vinyl monomer part in a same molecule and a photopolymerization initiator which exist outside the heat-responsive microcapsule or another recording material having an image forming layer comprising an electron-donating achromatic dye encapsulated in a heat-responsive microcapsule, as well as an electron-receptive compound, a polymerizable vinyl monomer and a photopolymerization initiator which exist outside the microcapsule. Both recording materials described above are described in detail in Unexamined Japanese Patent Application (Kokai) No. 10-226174 filed by the same assignee of the present invention.

The image recording apparatus utilizing such recording materials, for example, exposes each of the recording materials imagewise with a laser beam modulated in accordance with the image to be recorded so that the thus exposed portion is polymerized in accordance with a quantity of exposure light to be in a non-coloring state and, then, performs thermal development on the thus exposed recording material to allow the dye in the microcapsule in a non-exposed portion to form a color thereby forming the image. As another example, it is permissible that, after an image is recorded by forming the color in the recording material with the thermal head or the heat-mode laser, the whole surface of the recording material is exposed to allow the image forming layer to be polymerized thereby fixing the thus recorded image.

In the thermal image recording apparatus (hereinafter referred to simply as "recording apparatus") 10 according to the present invention, the thermal head 12 is a conventional one having a glaze 18 that forms on the substrate a glaze layer (heat storage layer) on which heat-generating elements comprising heat-generating resistors and electrodes are arranged in one direction (i.e., main scanning direction shown in the direction of arrow X in FIG. 1).

Figure 2A:
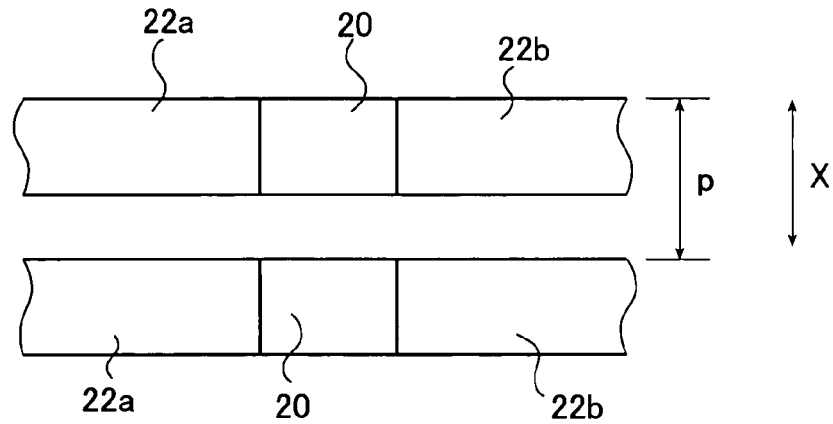
FIGS. 2A, 2B and 2C are each a schematic diagram showing an embodiment of a heat-generating element (heater) of the thermal head used in the thermal recording apparatus shown in FIG. 1.
Figure 2B:
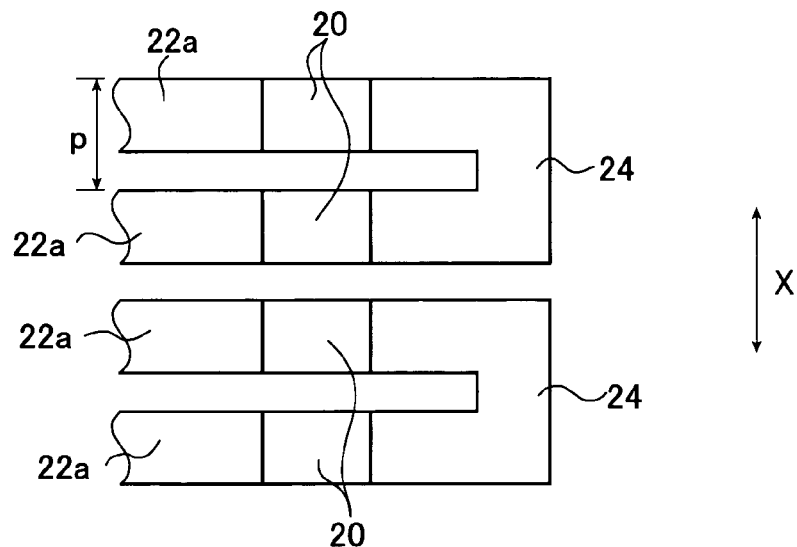
Figure 2C:
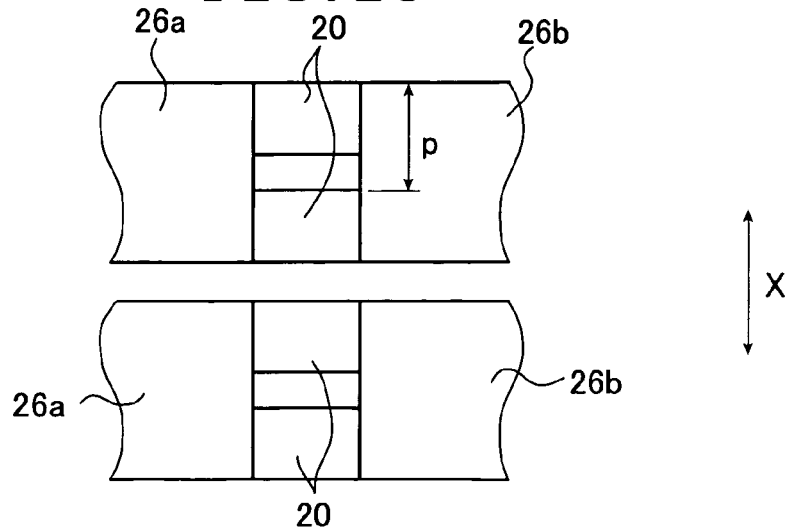

The construction of the heat-generating element (heater) is not limited to any particular type. The heat-generating element may be of a common type, as shown in FIG. 2A, in which a pair of electrodes 22a and 22b are formed on the opposite sides of one heat-generating resistor 20 in a manner that the heat generating resistor is interposed between these two electrodes, of another type (hereinafter referred to simply as "U-shaped heater"), as shown in FIG. 2B, in which two heat-generating resistors are connected with electrodes 22a at one end of each of the resistors and are connected with a nearly U-shaped electrode 24 at the other end of each of the resistors or of the other type (hereinafter referred to simply as "slit heater"), as shown in FIG. 2C, in which a pair of electrodes 26a and 26b formed on the opposite sides of two heat-generating resistors 20 in a manner that the two heat-generating resistors are interposed between these two electrodes.

According to the present invention, in any of the above-described types, the recording pixel density of the thermal head 12 is an integral multiple of the reading pixel density in the image data supply source R.

For example, if the reading pixel density in the image data supply source R is 254 dpi (reading pixel size is 100 μm), the recording pixel density can be twice the reading pixel density, namely, 508 dpi (recording pixel size is 50 μm). For example, when one pixel in the main scanning direction is recorded with one heat-generating element (one dot), a region shown by a p in FIGS. 2A, 2B and 2C is one pixel.

In this example, the recording pixel density may be set as 254 dpi; however, if the recording pixel density is 254 dpi, namely, the recording pixel size is 100 μm, a scanning line structure can be recognized visually. This phenomenon is not favorable for the image quality; hence, the recording pixel density is preferably 508 dpi or may be more.

Moreover, according to the present invention, in the image recording apparatus which performs image recording with a laser beam such as the above-described thermal recording or image recording due to exposure and thermal color development using a heat-mode laser, the size of one pixel to be formed by the laser beam may be set to be a reciprocal number of the integral multiple of the size of one pixel in the image data supply source R.

In the recording apparatus 10, the image recording by the thermal head 12 is fundamentally performed in a similar manner to that of a conventional thermal printer whereupon the image recording is performed by heating a thermal material M imagewise with the glaze 18 of the thermal head 12 being pressed on the thermal material M and with each heat-generating element being driven in accordance with the image to be recorded as the thermal material M is transported in the auxiliary scanning direction (in the direction of arrow Y in FIG. 1) which is perpendicular to the main scanning direction by the platen roller 14 rotated by a motor 28

Driving of the heat-generating element is performed in accordance with the image data processed in the image data processing section 16.

The image data processing section 16 comprises a sharpness correcting subsection 30 and an electronic magnification processing (scaling) subsection 32.

Except for such subsections, the image data processing section 16 may of course comprise a site which performs a known processing (image processing or signal processing) operation such as a tonal correction, a black ratio correction, a shading correction, a resistance value correction, a temperature correction or the like which has been performed in the image recording apparatus utilizing the thermal head.

The sharpness correcting subsection 30 is a site which performs a sharpness correction processing for enhancing image sharpness on a diagnostic image (image data thereof) supplied from the image data supply source R.

The method of performing the sharpness correction processing is not limited to any particular manner, but various known methods are applicable.

An exemplary method is illustrated as follows: for example, let assume that one screen of the image is dividable into n×n pixels, with $S_{ij}$ being written (I=1, 2, ..., n; j=1, 2, ... n) for the image data of the pixel that is on a specified pixel line i the ith in the direction in which the glaze 18 extends; then, as a first step, the image data $S_{ij}$ and surrounding image data thereof are averaged so that the image data $S_{ij}$; is converted into a first unsharpness signal $U^1_{ij}$ which is electrically blurred image data; then, the thus obtained first unsharpness signal $U^1_{ij}$ is further averaged to calculate a second unsharpness signal $U^2_{ij}$; next, the difference between the first unsharpness signal $U^1_{ij}$ and the second unsharpness signal $U^2_{ij}$ is determined; finally, the thus obtained difference is multiplied by the coefficient K of sharpness correction and added to the first unsharpness signal $U^1_{ij}$, namely, in accordance with the following equation, to produce a sharpness enhanced image data $S^*_{ij}$:

$$S^*_{ij} = U^1_{ij} + K(U^1_{ij} - U^2_{ij})$$

In this case, in the recording apparatus 10 which performs image recording utilizing the thermal head 12, it is preferable that an initial state of each characteristic of the thermal head 12 is measured and then, being based on the thus measured initial state, enhancement degree of sharpness correction (for example, the above-described sharpness correction coefficient K) is adjusted.

In a case in which characteristic values are, for example, glaze height H, glaze width W, protective film thickness d, heater width l, heater length L and the like, an exemplary method is preferably illustrated as follows: if reference values and measured initial values of glaze height H, glaze width W, protective film thickness d, heater width l and heater length L are taken as $H_0$, $W_0$, $d_0$, $l_0$ and $L_0$, and $H_i$, $W_i$, $d_i$, $l_i$ and $L_i$ respectively, respective rates of changes of sharpness $k_1$, $k_2$, $k_3$ and $k_4$ in initial values $H_i \times W_i$, $d_i$, $l_i$ and $L_i$ against respective reference sharpness in corresponding reference values $H_0 \times W_0$, $d_0$, $l_0$ and $L_0$ are determined by means of respective predetermined relationships; next, an overall rate of change k of all the characteristic values is determined as a product of all the rates of changes $k_1$, $k_2$, $k_3$ and $k_4$; and finally, the enhancement degree of sharpness correction is multiplied by 1/k.

Another preferred method is illustrated as follows: relationship between the number of recorded sheets or the recording time of the thermal material by the thermal head 12, or the recording data history and the change of each characteristic of the thermal head 12 is preliminarily obtained; next, a change of each characteristic against the actually measured number of recorded sheets or recording time, or actually measured recording data history is predicted; and finally, being based on the predicted change of each of the characteristics, enhancement degree of sharpness correction is adjusted.

In this case, it is preferable that the characteristic is taken as protective film thickness d of the thermal head 12; then, a reference value and a predicted value thereof are set as $d_0$ and $d_p$ respectively; next, the rate of the change $k_2$ of sharpness in the predicted value $d_p$ against reference sharpness in the reference value $d_0$ is determined by the predetermined relationship; and finally, enhancement degree of sharpness correction is multiplied by $1/k_2$.

Such methods of sharpness correction are described in Unexamined Published Japanese Patent Application (kokai) No. 10-44484.

The electronic magnification processing (scaling) subsection 32 is a site which performs an interpolation magnifying process in accordance with the difference between the reading pixel density in the image data supply source R and the recording pixel density by the thermal head 12 so as to allow the output image by the recording apparatus 10 (thermal head 12) to have the size equal to that of the reading image (affected areas part) by the image data supply source R.

As described above, the recording apparatus 10 according to the present invention has the recording pixel density which is an integral multiple of the reading pixel density in the image data supply source R so that, in a case of outputting the image having the equal size, the interpolation magnifying process is a magnifying process of integral multiple based on the ratio between both pixel densities. For example, if the above-described reading pixel density and recording pixel density are both 254 dpi, the magnifying process of multiple of 1 will be performed (namely, no magnifying process is performed); while, if the reading pixel density and recording pixel density are 254 dpi and 508 dpi respectively, magnifying process of multiple of 2 will be performed.

In the recording apparatus 10 according to the present invention, interpolation magnifying method of the image is not limited to any particular type, but various types of known methods such as a method utilizing spline interpolation and the like are applicable and, preferably, a method utilizing interpolation magnifying process by replication is used.

Figure 3:
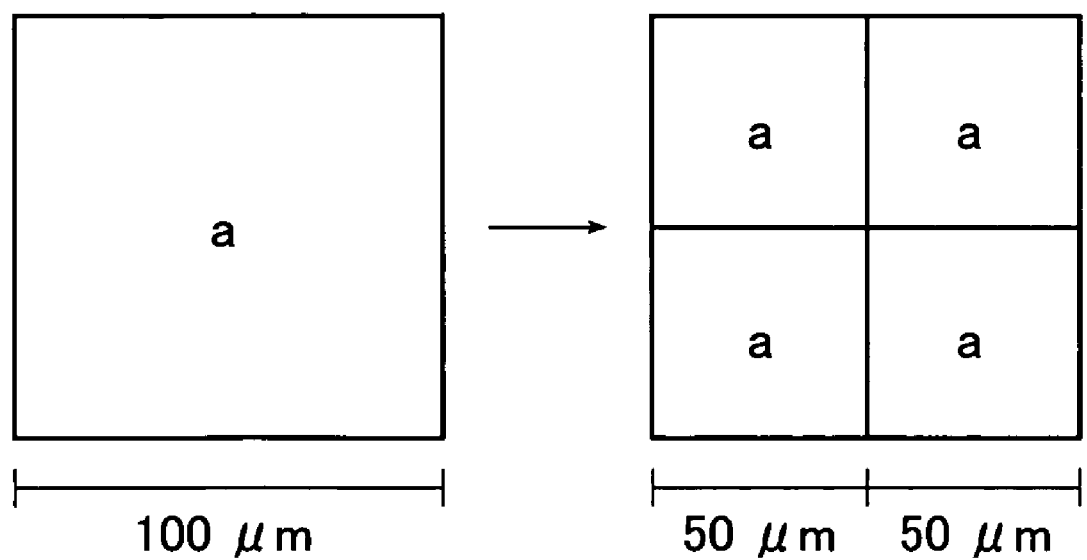
FIG. 3 is a schematic view of an example illustrating image recording in the thermal recording apparatus shown in FIG. 1.

Namely, when the reading pixel density and recording pixel density are 254 dpi (one pixel is 100 μm) and 508 dpi respectively, as shown in FIG. 3, if a certain pixel of the image read by the image data supply source R is image data of a, four replications of the image data of a are produced and, then, interpolation magnifying process is performed so as to express a of one pixel having 100 μm at 254 dpi by means of a of 50 μm×4 pixels at 508 dpi whereupon the output image comes to have the size equal to that of the reading image by the image data supply source R.

Even when interpolation magnifying process of integral multiple is performed, if it is performed with the method such as the spline interpolation or the like, a high frequency component is also decreased leading to decreased sharpness compared with that being not subjected to interpolation magnifying process; however, in this case, decrease of sharpness is preferably prevented by utilizing the replication whereupon an image with higher sharpness can be outputted.

Moreover, in the U-shaped heater or slit heater described above, if one image data (energy) is supplied to two neighboring heat-generating elements sharing a common electrode, both heat-generating elements record the same image (density) so that the number of replications of image data in the main scanning direction can be reduced; hence these heaters are advantageous from the standpoint of memory, processing efficiency or the like.

Furthermore, in the recording apparatus 10 according to the present invention, the image to be outputted is not always limited to having the size equal to that of the reading image by the image data supply source R, but may have a different size from that of the reading image and, moreover, in this case, interpolation magnifying process may not be of integral multiple.

In such ways, the image data subjected to predetermined processing operations including sharpness correction and interpolation magnifying process in the image data processing section 16 is outputted in a driver of the thermal head 12 enabling it to drive and heat each heat-generating element of the thermal head 12 in accordance with the thus outputted image data whereupon the image having the size equal to that of the reading image by the image data supply source R is outputted.

On the foregoing pages, the image recording apparatus according to the present invention has been described in detail but the present invention is in no way limited to the stated embodiments and various improvements and modifications can of course be made without departing from the spirit and scope of the invention.

As described above in detail, the image recording apparatus according to the present invention is capable of outputting the medical diagnostic image which has high sharpness and high quality as well as the size equal to that of the affected areas part by utilizing the dry printer that is easy to perform the processing such as the development and the maintenance.

What is claimed is:

1. An image recording apparatus for outputting a hardcopy using image data supplied from a medical diagnostic image generating apparatus, comprising:
   a sharpness correcting device for performing a sharpness correction process on the image data supplied from said medical diagnostic image generating apparatus;
   a scaling device for performing an electronic magnification process of an integral multiple on the image data processed in said sharpness correcting device; and
   an outputting device for performing image recording with a recording pixel density which is an integral multiple of a reading pixel density in said medical diagnostic image generating apparatus using the image data processed in said scaling device and then outputting the hardcopy by performing a dry process.

2. The image recording apparatus according to claim 1, wherein the recording pixel density in said outputting device is 508 dpi.

3. The image recording apparatus according to claim 1, wherein the electronic magnification process in said scaling device is performed by means of replication.

4. The image recording apparatus according to claim 1, wherein magnification comprises an adjustment of a physical image size produced by the image data.

5. The image recording apparatus according to claim 1, wherein the magnification comprises outputting a pixel size which is reciprocal to an amount of magnification.

6. The image recording apparatus according to claim 1, wherein the sharpness correcting device operates according to historical data of at least one of a recording time and a recording characteristic of the outputting device.

7. The apparatus of claim 1, wherein the integral multiple is greater than 1.

8. The apparatus of claim 7, wherein a record pixel has a smaller dimensional size than a read pixel.

* * * * *